United States Patent

[11] 3,607,422

| [72] | Inventor | Paul J. Moran |
| | | Ballston Lake, N.Y. |
| [21] | Appl. No. | 664,367 |
| [22] | Filed | Aug. 30, 1967 |
| [45] | Patented | Sept. 21, 1971 |
| [73] | Assignee | General Electric Company |

[54] METAL-AIR CELL
4 Claims, 1 Drawing Fig.

[52] U.S. Cl............................................................. 136/86 A
[51] Int. Cl....................................................... H01m 29/04
[50] Field of Search........................................... 136/86, 86 A

[56] References Cited
UNITED STATES PATENTS

| 3,043,898 | 7/1962 | Miller et al. ................... | 136/86 |
| 3,215,562 | 11/1965 | Hindin........................... | 136/86 |
| 3,260,620 | 7/1966 | Gruber........................... | 136/86 |
| 3,432,354 | 3/1969 | Jost................................ | 136/86 |

Primary Examiner—Allen B. Curtis
Attorneys—Richard R. Brainard, Paul A. Frank, Charles T. Watts, Paul R. Webb II, Melvin M. Goldenberg, Frank L. Neuhauser and Oscar B. Waddell ABSTRACT: A metal-air cell has a cathode, an aqueous electrolyte, a magnesium anode, and an electronically conductive porous grid positioned in contact with the electrolyte and between the cathode and the anode, and connected electrically to the cathode. A modified metal-air cell has such a porous grid connected electrically to a separate reference cathode which is in contact with both the air supply and the electrolyte.

PATENTED SEP 21 1971 3,607,422
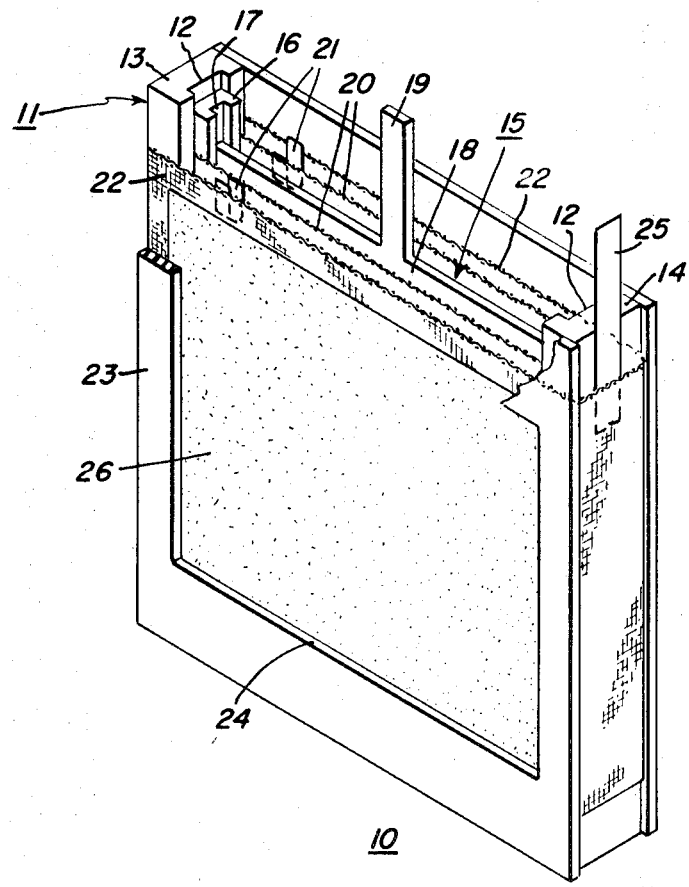
Inventor:
Paul J. Moran,
by Paul R. Webb, II
His Attorney.

METAL-AIR CELL

This invention relates to metal-air cells and, more particularly, to metal-air cells in which a porous grid is positioned in contact with the electrolyte and between the cathode and anode of the cell and connected electrically to the cathode.

Metal-air cells are galvanic cells which use an oxidant of oxygen or oxygen from the air as the reactive material consumed at the positive electrode of the cell. The oxygen thereby serves as the cathode depolarizer. Such cells employ a saline or alkaline electrolyte. Magnesium is a commonly used anode material in such a cell since it is generally low in cost and light in weight. However, during the operation of such a cell, the magnesium forms a precipitate which deposits on the cathode and forms a sludge in the electrolyte. When such a precipitate forms, the energy output drops rapidly and the utilization of the magnesium is diminished. It is then required to remove the cathode and clean the cathode, for example in an acid bath, as well as remove the sludge from the cell and replace the electrolyte to restore the cell to its useful operating condition.

My present invention is directed to an improved metal-air cell which substantially reduces or eliminates the adverse effects of the precipitation from the magnesium anode during operation.

It is a primary object of my invention to prevent precipitation from the magnesium anode from forming on the cathode.

It is another object of my invention to reduce the amount of sludge formed in the electrolyte from precipitation produced by the magnesium anode reaction.

It is a further object of my invention to provide such an improved metal-air cell which will operate for a longer period of time and require less maintenance.

In accordance with my invention, a metal-air cell comprises a cathode, an aqueous saline or alkaline electrolyte, a magnesium anode, and an electronically conductive, porous grid positioned in contact with the electrolyte and between the cathode and the anode, and connected electrically to the cathode.

These and various other objects, features, and advantages of the invention will be better understood from the following description taken in connection with the accompanying drawing in which:

The single FIGURE is a perspective view of a metal-air cell embodying my invention.

In the single FIGURE of the drawing, there is shown generally at 10 an improved metal-air cell embodying my invention. Cell 10 has a casing 11 in the form of a U-shaped frame. A vertical groove 12 is provided for each of the opposite frame members 13 and 14. A removable unit 15, which is positioned in grooves 12 of members 13 and 14 of casing 11, comprises a pair of spaced guides 16, each of what is provided with a vertical groove 17 to receive an edge of a magnesium anode plate 18. A terminal strip 19 is formed integrally with plate 18 and extends upwardly and outwardly from guides 16. An electrically conductive porous grid 20, which is shown positioned on each side of and spaced from anode plate 18, is secured, for example, to the outer edges of guides 16. Suitable means (not shown) can be provided, for example, in the form of a bail to facilitate easy removal of unit 15 from cell 10. An electrically conductive connection in the form of a U-shaped spring clip 21 is affixed to the upper edge of each grid 20.

On opposite outer surfaces of casing 11 a metal screen 22 is shown sealed thereto. Screen 22 is shown as a single piece of screen extending around one side edge of casing 11. A face piece 23 is sealed to each of the opposite surfaces of casing 11 and overlies the edges of screen 22. Each of the facepieces 23 is provided with a large opening 24 whereby the portion of screen 22 lying within open portion 24 forms a part of a gas permeable, liquid impermeable cathode electrode which is coextensive with opening 24. A terminal strip 25 is attached to screen 22 at its edge to provide an electrical connection for the cathode. A cathode 26 is shown coextensive with each opening 24 and includes the portion of screen 22 within such opening. Spring clips 21, each of which is affixed to grid 20, contacts screen 22 of cathode 26 to connect electrically grid 20 to cathode 26. If it is desired, one porous grid 20 can be connected to cathode 26 while the other grid 20 is connected to the first grid 20. In the above manner, porous grid 20 is at the same potential as cathode 26 during the operation of the cell. Thus, in effect, grid 20 acts as an equipotential surface to the actual cathode and is positioned between the actual anode and the actual cathode.

While the cathode is shown in the above form, various types of cathodes are known in the art for employment in a metal-air cell. The type of cathode shown in the FIGURE comprises screen 22 with a coating thereon of catalytic metal, unsupported or supported, and a binder of a suitable material, such as polytetrafluoroethylene, bonding the particles of the catalyst together and to screen 22 thereby resulting in cathode electrode 26. In such a cathode structure, the exterior faces thereof may be coated with a thin film of polytetrafluoroethylene to provide waterproofing for the structures.

Another improved cathode which is suitable for employment in the present invention is described and claimed in the copending application of Paul J. Moran and Harold A. Christopher Ser. No. 664,366, filed Aug. 30, 1967, which is assigned to the same assignee as the present application. The cathode in the above-mentioned copending application has an electronically conductive grid, a hydrophobic binder, and electronically conductive, catalytically active carbon particles held together and to the grid by the binder.

I have discovered that an improved metal-air cell can be constructed by employing a cathode, an aqueous electrolyte of a saline or an alkaline solution, a magnesium anode, and an electronically conductive, porous grid positioned in contact with the electrolyte and between the cathode and anode, and connected electrically to the cathode. In such a cell, a wide variety of cathodes which will operate as air cathodes can be employed. In the preferred device, the porous grid is connected electrically to the cathode so that both the grid and the cathode are at the same potential.

The grid structure must be electronically conductive, and must be porous. Various materials such as silver, nickel, platinum, Inconel, Monel, titanium, and stainless steels can be used for the grid. A wide variety of configurations for the grid are also suitable including screens, metal wires, punched metal plate, expanded metal plate, porous metal sheet, etc. If it is desired to increase the effectiveness of the grid as a deposition electrode, a catalyst can be employed. Suitable catalysts including platinum, palladium, and spinels, can be added to the grid in any suitable manner, such as for example, electrodeposition or by hydrophillic polymer bonding.

I have discovered that when the porous grid is positioned in the electrolyte of the cell between the cathode and anode and electrically connected to the cathode, it becomes effectively a cathode at the same potential in association with the anode. During the normal operation of a metal-air cell, magnesium hydroxide is formed from the magnesium anode, and coats the cathode, and forms a sludge at the bottom of the cell within the electrolyte. In my improved metal-air cell, the precipitate forms on and coats the porous grid as opposed to the air electrode, thereby eliminating the precipitation on the cathode of the cell. Secondly, the employment of this grid reduces the amount of precipitate which settles normally in the bottom of the cell within the electrolyte. In this manner, the cell operates efficiently for a much longer time requiring a minimum of maintenance. In the configuration shown in the FIGURE, the removable unit can be readily replaced when the anode has been sufficiently consumed or the porous grid has become plugged. In this manner, no cleaning of the cathode is required and the removal of sludge and replacement of electrolyte is minimized.

In addition to the preferred device shown in the single FIGURE, other metal-air cell configurations can be constructed employing a porous grid. A modified structure employs the same cathode, anode, grid, and electrolyte. However, a second and separate reference cathode is provided which is in contact with both the air and the cell. The porous grid is connected electrically to the separate reference cathode. The porous grid provides the same beneficial effect of having the precipitate from the anode form thereon, as opposed to formation on the cathode or in the electrolyte as sludge. Additionally, the grid can be operated at a potential different from the cathode and therefore independent of cell performance.

Examples of metal-air cells with an electronically conductive, porous grid made in accordance with my invention are set forth below:

EXAMPLE 1

A metal-air cell was constructed in accordance with the FIGURE of the drawing except that a single cathode was employed. The cathode was formed of a nickel screen on which had been provided a catalyst metal of platinum bonded together and to the screen by polytetrafluoroethylene in accordance with the teachings of the copending application of Leonard W. Niedrach and Harvey R. Alford, Ser. No. 232,689, filed Oct. 24, 1962, now U.S. Pat. No. 3,432,355 and assigned to the same assignee as the present invention.

The anode was magnesium metal while the electrolyte was a 7 weight percent solution of sodium chloride. The porous grid was a silver screen positioned between the anode and cathode in contact with the electrolyte and connected electrically to the cathode by an external lead.

The cell was operated for a period of 12 hours. Prior to its operation, the porous grid was weighed. Subsequent to the operation, the grid was removed, dried, and weighed. The weight gain from precipitation from the magnesium anode was at a rate of 0.26 milligrams per hour per square centimeter. Visual observation was also made of the cathode which did not appear to have any precipitate thereon, and upon draining the electrolyte it was noted that there was a minimum of a sludge present.

EXAMPLE 2

Another metal-air cell was constructed and operated as set forth in example 1. A similar weight gain of the grid from precipitation from the magnesium anode was noted. A similar visual observation was made of both the cathode and electrolyte.

While other modifications of the invention and variations thereof which may be employed within the scope of the invention have not been described, the invention is intended to include such as may be embraced within the following claims:

What I claim as new and desire to secure by Letters Patent of the United States is:

1. In a metal-air cell comprising at least one cathode, an aqueous electrolyte, and a magnesium anode, the combination therewith of an electronically conductive, porous grid positioned in contact with the electrolyte and positioned between and spaced from each cathode and the anode, and connected electrically to a cathode.

2. A metal-air cell according to claim 1, in which the grid has a catalyst deposited thereon.

3. A metal-air cell as in claim 1, in which the electrolyte is sodium chloride, and the grid is a silver screen.

4. In a metal-air cell comprising at least one cathode, an aqueous electrolyte, and a magnesium anode, the combination therewith of an electronically conductive porous grid positioned between and spaced from each cathode and the anode, a reference cathode in contact with the electrolyte, and each grid spaced from and connected electrically to the reference cathode.